Aug. 25, 1970        H. C. BUCHANAN, JR        3,525,890
FACE PLANOCENTRIC SPEED REDUCTION UNIT AND MOTOR
Filed Feb. 16, 1968                    2 Sheets-Sheet 1
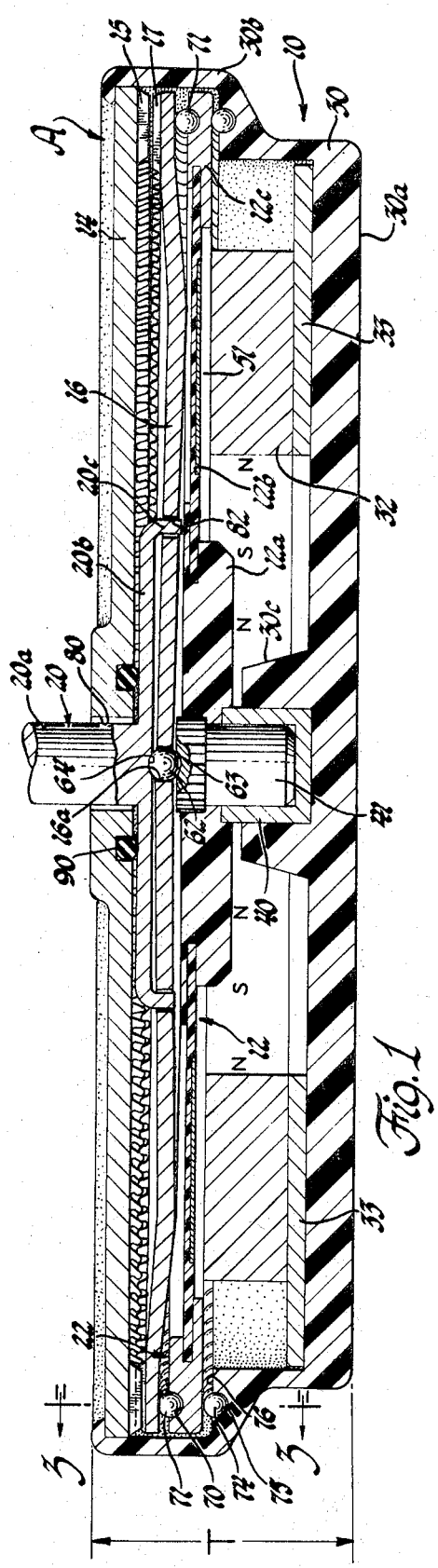
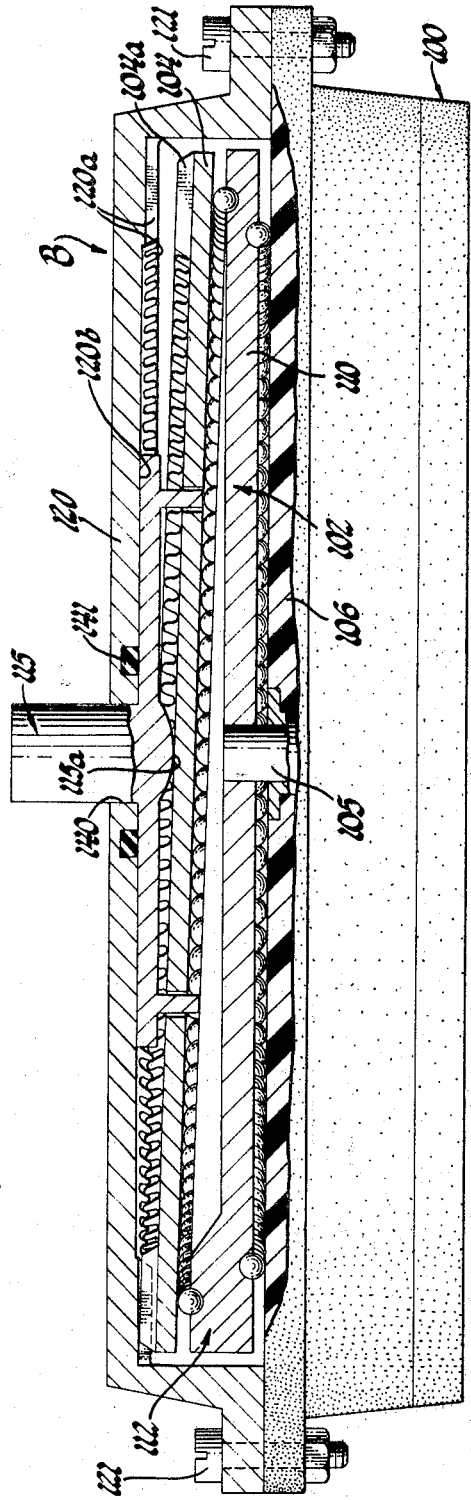
INVENTOR.
*Harry Charles Buchanan, Jr.*
BY
*W. A. Schuetz*
ATTORNEY Aug. 25, 1970  H. C. BUCHANAN, JR  3,525,890
FACE PLANOCENTRIC SPEED REDUCTION UNIT AND MOTOR
Filed Feb. 16, 1968  2 Sheets-Sheet 2

INVENTOR.
Harry Charles Buchanan, Jr.
BY
W. A. Schuetz
ATTORNEY

United States Patent Office
3,525,890
Patented Aug. 25, 1970

---

3,525,890
FACE PLANOCENTRIC SPEED REDUCTION UNIT AND MOTOR
Harry Charles Buchanan, Jr., Dayton, Ohio, assignor to General Motors Corporation, Detroit, Mich., a corporation of Delaware
Filed Feb. 16, 1968, Ser. No. 705,966
Int. Cl. H02k 7/06
U.S. Cl. 310—82                                 9 Claims

ABSTRACT OF THE DISCLOSURE

In a preferred form, this disclosure relates to a face planocentric speed reduction unit which comprises a relatively thin package. The speed reduction unit has a rotatable means for continuously wobbling a thin wobble face gear to continuously cause different portions thereof to engage another thin face gear. The number of teeth on the respective gears are different and one of the gears is held against rotation whereby the other of the gears is rotated relative to the one gear and relative to the rotatable means at a lesser rotative speed.

---

The present invention relates to a drive mechanism, and in particular to a face planocentric speed reduction unit for effecting large speed reductions.

An important object of the present invention is to provide a new and improved face gear drive mechanism, preferably for use as a speed reduction unit, and which is of a highly practical and economical construction and which comprises a relatively thin unit or package.

Another object of the present invention is to provide a new and improved face planocentric speed reduction unit which includes an electric disc-type motor and in which the entire unit comprises a relatively thin package whereby it is particularly suitable for use as a speed reduction unit in applications where the space provided for the speed reduction unit is very narrow, such as for use in a power operated window regulator mechanism mounted within a door of an automotive vehicle.

Yet another object of the present invention is to provide a new and improved speed reduction unit in which a rotatable input means is rotated to continuously effect wobbling movement of a plate-like face gear into engagement wtih another plate-like face gear, and in which the number of teeth on the respective face gears are different and wherein one of the gears is held against rotation so as to effect rotational movement of the other gear at a reduced rotational speed as compared to the rotational speed of the input means.

A further object of the present invention is to provide a new and improved face gear speed reduction unit and in which the input means is the armature of an electric motor, preferably the armature of a disc-type electric motor.

A still further object of the present invention is to provide a new and improved face planocentric speed reduction unit and in which the entire unit is housed within a single, relatively thin housing and with the non-wobbling face gear providing an end closure for the housing, and in which the entire unit is sealed from the surrounding atmosphere.

Yet another object of the present invention is to provide a new and improved face planocentric speed reduction unit in which the disc-shaped armature of a disc motor is utilized to continuously wobble a wobble face gear so as to continuously cause different angular portions thereof to engage a stationary face gear having a different number of teeth than the wobble gear and thereby cause the wobble gear to rotate relative to the stationary gear and at a reduced rotational speed as compared to the rotational speed of the motor armature.

The present invention further resides in various novel constructions and arrangement of parts, and further objects, novel characteristics and advantages of the present invention will be apparent to those skilled in the art to which it relates and from the following detailed description of the illustrated embodiments thereof made with reference to the accompanying drawing forming a part of this specification and in which similar reference numerals or characters are employed to designate corresponding parts throughout the several views, and in which:

FIG. 1 is an axial cross-sectional view, with certain parts shown in elevation, of a preferred embodiment of the face planocentric speed reduction unit of the present invention;

FIG. 4 is an axial cross-sectional view, with parts thereof shown in elevation, of another embodiment of a face planocentric speed reduction unit of the present invention.

Figure 3:
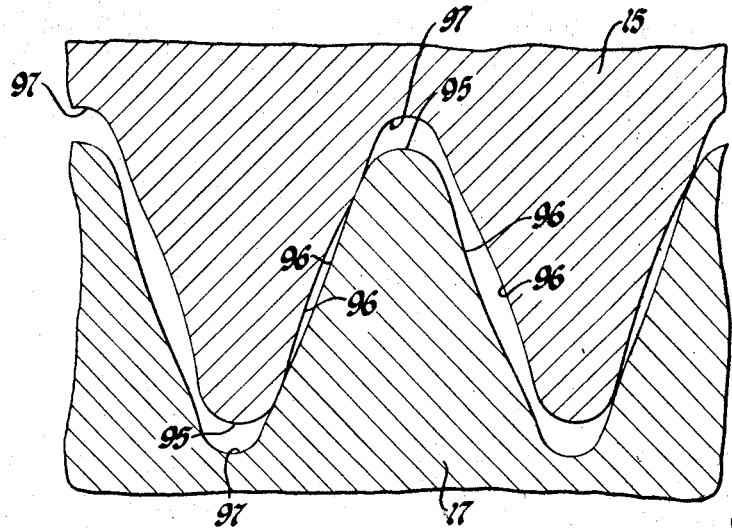
FIG. 3 is an enlarged fragmentary sectional view taken approximately along line 3—3 of FIG. 1.
Figure 2:
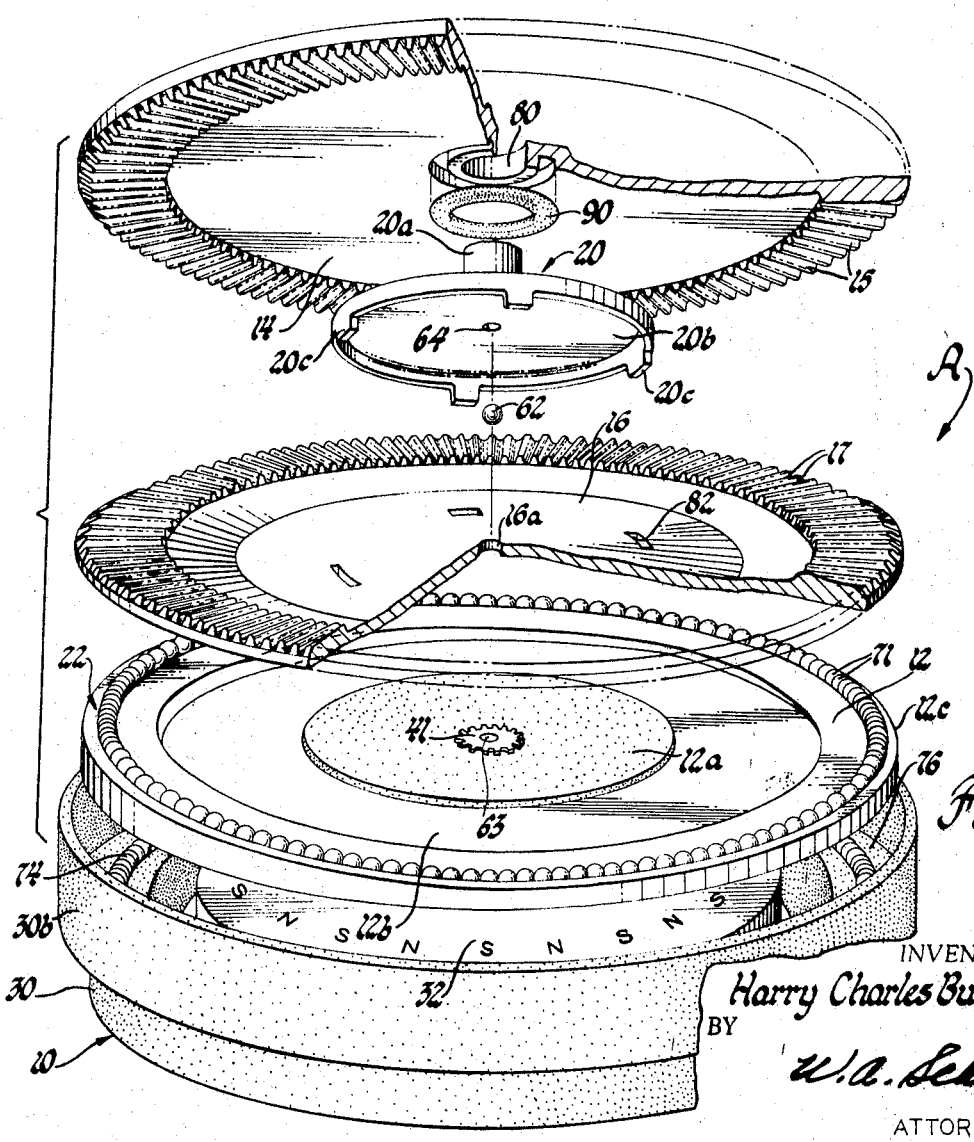
FIG. 2 is an exploded view on a reduced scale of parts of the speed reduction unit shown in FIG. 1.

The present invention provides novel face gear drive mechanisms, and in particular provides novel face planocentric speed reduction units for effecting relatively large speed reductions. Although the novel speed reduction units of the present invention could be used in various applications wherein a speed reduction is desired, they are particularly susceptible for use in applications which require that the unit be a relatively thin package due to space requirements. For example, in automotive vehicles the space provided for the various power operated drive units for actuating different components of the vehicle is often relatively small or narrow, such as the relatively narrow space provided between the inner and outer panels of a vehicle door for housing a drive unit to actuate a window regulator mechanism. For the purposes of illustration the face planocentric speed reduction units of the present invention will be described as being used for the latter purpose.

As representing a preferred embodiment of the present invention, FIG. 1 of the drawings shows a face planocentric speed reduction unit A. The speed reduction unit A comprises, in general, a reversible, electric, disc-type motor 10 having a rotatable armature 12, a stationary or first annular face gear 14 having a given number of gear teeth 15, a rotatable wobble face gear 16 supported for wobbling movement about its center and which has a number of gear teeth 17 different from the given number on the stationary gear 14, and an output member 20 drivingly connected with the rotatable wobble gear 16. The armature 12 has a ramp or ramp means 22 thereon for effecting wobbling movement of the wobble gear 16 to continuously cause different portions of the wobble gear 16 to engage the stationary gear 14 and thereby effect a rotational movement of the wobble gear 16 relative to the stationary gear 15 and at a reduced rotational speed as compared to the rotational speed of the armature 12.

The electric disc-type motor 10 could be of any suitable or conventional type, but is preferably a reversible, permanent magnet disc motor. The motor 10 comprises a motor housing 30 having a planar bottom wall 30a and a stepped axially extending side wall 30b. The electric motor 10 further comprises a permanent magnet means 32 carried by an annular support plate 33 which in turn is secured to the bottom wall 30a. The permanent magnet means 32, in the illustrated embodiment, comprises an annular member of suitable permanent magnet material having north and south poles N and S, respectively, located at annularly spaced locations. The flux path of the permanent magnet means 32 is from the north pole end N through the wobble gear 16 and back to the south pole S.

The motor armature 12 is rotatably supported by the bottom wall 30a of the motor housing 30 for rotation about an axis extending normal to the bottom wall 30a. To this end, the bottom wall 30a has a central boss portion 30c for supporting a suitable bearing or bushing 40, the bushing 40 in turn rotatably supporting an armature stub shaft 41.

The armature 12 comprises a hub portion 12a fixedly secured to the stub shaft 41, an annular plate-like disc portion 12b secured to the hub portion 12a and an annular outer ring portion 12c secured to the outer end of the disc portion 12b. The disc portion 12b of the armature 12 could either contain printed circuits or be of a laminated construction having a plurality of copper windings or conductors (not shown) embedded therein. The armature conductors are adapted to be electrically connected via suitable brushes (not shown) and suitable reversing circuits (not shown) to the battery of the vehicle so that rotation of the armature 12 in either direction can be effected, and in a manner well known to those skilled in the art. The disc portion 12c of the armature is spaced from the upper end of the permanent magnet means 32 as shown in FIG. 1 to provide an air gap 51.

The armature 12, when rotated, is adapted to continuously effect a wobbling movement of the wobble gear 16. To this end, the wobble gear 16 is supported for wobbling movement about its center and the annular outer ring 12c of the armature 12 is provided with the ramp means 22. The wobble gear 16 is a thin plate-like member and has a central through opening 16a which slidably receives a spherical ball or ball bearing 62. The ball 62 is rotatably received in complementary shaped and aligned depressions 63 and 64 in the upper and lower ends of the armature shaft 41 and the output member 20, respectively, as viewed in FIG. 1. The space between the output member 20 and the armature shaft 41 is greater than the transverse dimension of the wobble gear 16 so as to allow for wobbling movement of the wobble gear about its center, i.e., the center of the ball 62.

The ramp means 22 on outer annular ring 12c of the armature 12 is an axially thickened portion of a predetermined angular extent and whose thickness gradually diminishes from the high or mid-point of the thickened portion. The ring 12c is provided with an annular groove 70 in which a plurality of balls or ball bearings 71 are rotatably received. As best shown in FIG. 1, the uppermost point of the rotatable balls 71 engage the wobble gear 16 on its side opposite the side containing the gear teeth 17. The provision of the rotatable balls 71 enables the armature 12 to engage and rotate relative to the wobble gear 16 with a minimum amount of friction, the balls 71 rolling on the side surface of the wobble gear 16 when the armature 12 is rotated. The outer ring 12c of the armature 12 in turn is supported by a plurality of balls or ball bearings 74 disposed in an annular groove 75 on the step 76 of the axially extending side wall 30b. The balls 74 likewise provide for a minimum of friction when the armature 12 is rotated relative to the housing 30.

As best shown in FIG. 1, the ramp means 22 on the armature 12 cause the wobble gear 16 to lie in a skewed or nonnormal plane with respect to the axis of rotation of the armature 12 and the adjacently located portion of the wobble gear 16 to be disposed so that some of its teeth 17 engage the teeth 15 on the stationary gear 14. The teeth 17 on the diametral opposite portion of the wobble gear 16 are out of engagement with or spaced from the teeth 15 of the stationary gear 14.

The fixed stationary gear 14 comprises a thin plate-like member which extends parallel to the bottom wall 30a of the housing 30 and which has its outer periphery fixed to the side wall 30b of the housing 30. To this end, the upper end of the side wall 30b of the housing 30, as viewed in FIG. 1, is peened over and suitably keyed or otherwise secured to the outer periphery of the stationary gear 14. The stationary gear 14 has a central through opening 80 through which the shaft portion 20a of the output member 20 extends. The output member 20 at its inner end 20b is in the form of a flat plate having axially downwardly extending projections 20c at spaced peripheral locations which are slidably received in oversized openings or slots 82 in the wobble gear 16. The provision of the oversized openings or slots 82 enables the wobble gear 16 to wobble relative to the output member 20 while remaining drivingly engaged therewith.

In operation, when the armature 12 is rotated the ramp means 22 thereon is rotated. When the ramp means 22 is rotated it continuously causes, through the balls 71, different angular portions of the wobble gear 16 to be moved into engagement with the teeth 15 on the stationary gear 14. Since the number of teeth on the stationary and wobble gears 14 and 16 are different and since the stationary gear 14 is held against rotation, the wobble gear 16 will rotate relative to the stationary gear 14.

The difference in the number of teeth on the wobble and stationary gears 16 and 14 can be any suitable number for effecting the desired speed reduction. For example, if the number of teeth on the wobble gear 16 were 50 and the number on the stationary gear 14 were 51 then a 50 to 1 speed reduction would be effected. That is for each rotation of the armature 12 the wobble gear 16 would be rotated $\frac{1}{50}$ of a rotation. When the wobble gear 16 is rotated the output member 20 is rotated at the same rotative speed. The output member 20 is adapted to be connected to a suitable window regulator mechanism (not shown) for raising and lowering a window of the vehicle depending upon its direction of rotation. The direction of rotation of the output member 20 is controlled by the direction of rotation of the armature 12. The armature when rotated in one direction causes a camming action along one of the sides or flanks of the gear teeth 15 and 17 to effect rotation of the wobble gear 16 in one direction and when rotated in the opposite direction causes a camming action along the other sides or flanks of the gear teeth 15 and 17 to effect rotation of the wobble gear 16 in the other direction.

An important feature of the present invention is that by utilizing the armature 12 of the disc motor 10 itself as the input means for causing the wobbling movement of the wobble gear the need for a separate input means connected with the armature shaft for performing the same purpose is eliminated and that the overall thickness, i.e., the dimension T, as shown in FIG. 1, can be kept to a minimum so as to provide for a relatively thin unit or package. It is contemplated that the thickness of the unit could be made less than two inches.

Additionally, it should be noted that the entire unit is effectively sealed from the ambient atmosphere. The outer end of the stationary gear 14 is sealed to the side wall 30b of the housing 30 as a result of being fixed thereto and the upper end of the housing being peened over. The stationary gear 14 is also sealed with respect to the output member 20 by an annular O-ring 90. By providing such a sealed unit, the unit can be used in application where the ambient atmosphere would otherwise have adverse effects on the various components of the unit. Moreover, it should be noted that the wobble gear 16 serves the additional purpose of providing a flux path for the permanent magnet means 32.

The gear teeth 15 and 17 on the respective gears 14 and 16 can be of any suitable or conventional profile, but preferably have a profile (see FIG. 3) which deviates from an isosceles triangle in that they have rounded apices 95 and sides 96 which are slightly concave, as viewed externally thereof. They also have rounded bottoms 97. This profile provides for two transverse lines of engagement between the flanks of the teeth 15 and 17. It is believed that this increases the torque transmitting capability of the teeth over that of teeth having convex or straight sides, since the latter usually only provide for a single transverse line contact due to tolerance variations.

As representing another embodiment of the present invention, FIG. 4 of the drawings shows a face planocentric speed reduction unit B. The speed reduction unit B is similar in construction to the speed reduction unit A except that the reversible, electric disc-type motor 100 is a separate subunit and except that a separate input means 102 is provided for causing a wobbling of the wobble face gear 104.

The disc-type motor 100 can be of any suitable or conventional construction and has a rotatable armature shaft 105 which extends through its motor housing 106 and to which the input means 102 is affixed. The input means 102 comprises an annular, plate-like member 110 having an annularly extending ramp portion 112 which is similar to the ramp 22 formed on the outer ring 12c in the speed reduction unit A.

The speed reduction unit B also includes the wobble face gear 104 and an output member 115 which are drivingly connected and which are of an identical construction to the wobble gear 16 and output member 20 of the speed reduction unit A except that the output member 115 has an arcuate portion 115a engageable with the wobble gear 104 to allow the latter to wobble or pivot about its center. The speed reduction unit B further includes a stationary face gear 120 which is bolted to the motor housing 106 by bolts 121. The face gear 120 is a cup shaped member provided with a plurality of gear teeth 120a on its bottom wall 120b, which face toward the gear teeth 104a on the wobble gear 104, the number of teeth on the respective gears being different.

The speed reduction unit B operates in the same manner as the speed reduction unit A except that the input means 102 secured to the armature shaft 105 effects wobbling movement of the wobble gear 104, when rotated, rather than the armature of the motor as in the speed reduction unit A. As shown in FIG. 4, the speed reduction unit B is completely sealed from the ambient atmosphere, since the gear 120 is bolted to the motor housing 106 and the output member 115, which projects through an opening 140 in the bottom wall 120b, is sealed with respect to the bottom wall 120b via an O-ring 141.

It should be understood that the wobble gears in the speed reduction units A and B could be held against rotation and the stationary gears 14 and 120 could be supported for rotation, in which case the wobble gears would effect a rotation of the gears 14 and 120 and with the drive taken from the gears 14 and 120.

It also should be noted that the concept of utilizing the armature of a motor, preferably a disc-type motor, as the input means for effecting movement of a face gear about its center could also be used in other types of face gear drive mechanisms, such as the face gear harmonic drive mechanism disclosed in David F. Bremner, Jr. and Keith H. Carpenter patent application for Speed Reduction Unit, filed concurrently herewith and assigned to the same assignee as the present invention, and to which resort may be had. In utilizing this concept in the latter drive mechanism, the rotatable armature would continuously effect a flexing movement of different portions of a flexible face gear into engagement with the gear rather than effect a wobbling movement of a face gear as in the mechanism of the instant application.

Although the illustrated embodiments hereof have been described in great detail, it should be apparent that certain modifications, changes, and adaptations may be made in the illustrated embodiments, and that it is hereby intended to cover all such modifications, changes and adaptations which come within the scope of the appended claims.

What is claimed is:

1. A speed reduction unit comprising: a motor having a rotatable armature, a wobble face gear having a given number of gear teeth adjacent said armature, a second face gear adjacent said wobble gear and having a number of gear teeth which is different from the given number on said wobble gear, said wobble gear being supported for wobbling movement about its center and one of said wobble and second gears being held against rotation and the other of said gears being supported for rotation relative to said armature, said armature including means engageable with said wobble gear for imparting wobbling movement to said wobble gear to continuously cause different ones of said gear teeth of said wobble gear to meshingly engage said gear teeth of said second gear and effect rotational movement of said other gear relative to said one gear and at a lesser rotative speed than the rotative speed of said armature.

2. A speed reduction unit comprising: a disc-type electric motor having a pan-shaped housing defined by a generally planar bottom wall and a side wall and having an annular rotatable armature which is rotatable in plane extending transversely of said side wall, a first face gear extending transversely of said side wall and which forms an end closure for said housing at its end remote from said bottom wall, a second face gear disposed between said armature and said first gear, said first and second face gears having teeth which face each other and having different numbers of teeth, said second face gear being supported for wobbling movement about its center and one of said first and second face gears being held against rotation and the other of said face gears being supported for rotation relative to said armature, said armature including means engageable with said second gear for imparting wobbling movement thereto to continuously cause different portions of said second gear to meshingly engage said first gear and effect rotational movement of said other gear relative to said one gear and at a lesser rotative speed than the rotative speed of said armature.

3. A speed reduction unit as defined in claim 2 wherein said first gear is held against rotation and said second gear is supported for rotation relative to said armature, and including an output member which extends through an opening in said first gear and which is drivingly connected with said second gear so as to be rotatable with the second gear when the latter is rotated.

4. A speed reduction unit as defined in claim 3 and including means for effecting a seal between said first gear and said housing and said first gear and said output member whereby the interior of said housing is completely sealed from the ambient atmosphere.

5. A speed reduction unit as defined in claim 2 wherein said motor includes stationary permanent magnet means carried by said housing and located between said armature and said bottom wall, said magnet means having polarized poles and said second gear serving also as a flux path for the magnetic field of said magnet means.

6. A speed reduction unit as defined in claim 2 wherein said gear teeth on said first and second gears have intersecting flanks and rounded apices, said flanks being concave as viewed externally from the flanks.

7. A speed reduction unit comprising: an input means which is adapted to be rotated, a wobble gear having a given number of gear teeth and located adjacent said input means, a second gear adjacent said wobble gear and having a number of gear teeth which is different from the given number on said wobble gear, said wobble gear being a flat, thin member and being supported for wobbling movement about its center, one of said wobble and second gears being held against rotation and the other of said gears being supported for rotation relative to said input means, said input means comprising a rotatable member and means engageable with said wobble gear for imparting wobbling movement to said wobble gear to continuously cause different ones of said gear teeth of said wobble gear to meshingly engage said gear teeth of said second gear and effect movement of said other gear relative to said one gear and at a lesser rotative speed than the rotative speed of said input means, said means engageable with said wobble gear comprising a ramp portion on said rotatable member, an annular groove in said rotatable member, and a plurality of rollers disposed within said groove and engageable with said wobble gear, said ramp portion through said rollers effecting wobbling movement of said wobble gear when said rotatable member is rotated.

8. A speed reduction unit as defined in claim 7 wherein said rotatable member is the armature of a disc-type electric motor.

9. A speed reduction unit comprising: a motor having a rotatable armature, a first face gear having a given number of gear teeth adjacent said armature, a second face gear adjacent said first gear and having a number of gear teeth which is different from the given number on said first gear, one of said first and second gears being held against rotation and the other of said gears being supported for rotation relative to said armature, said armature including means engageable with said first gear for imparting movement to said first gear toward said second gear to continuously cause different ones of said gear teeth of said first gear to meshingly engage said gear teeth of said second gear and effect rotational movement of said other gear relative to said one gear and at a lesser rotative speed than the rotative speed of said armature.

References Cited

UNITED STATES PATENTS

| | | | |
|---|---|---|---|
| 2,275,827 | 3/1942 | Plensler | 310—82 |
| 2,953,944 | 9/1960 | Sundt | 310—82 |
| 3,262,081 | 7/1966 | Fairbanks | 310—82 |
| 3,374,371 | 3/1968 | Tinder | 310—83 |
| 3,428,839 | 2/1969 | Singleton | 310—80 |

WARREN E. RAY, Primary Examiner

R. SKUDY, Assistant Examiner

U.S. Cl. X.R.

74—640